United States Patent [19]

Porter et al.

[11] Patent Number: 5,460,304
[45] Date of Patent: Oct. 24, 1995

[54] MODULAR VEHICULAR CARRIER SYSTEM

[76] Inventors: Lawrence T. Porter, 309 N. 7th Ave., West Bend, Wis. 53095; Frank Mikic, 3329 99th St., Kenosha, Wis. 53142

[21] Appl. No.: 133,406

[22] Filed: Oct. 5, 1993

[51] Int. Cl.⁶ ..................................................... B60R 9/06
[52] U.S. Cl. .......................... 224/521; 224/527; 224/532; 224/534; 224/537; 224/917.5; 224/924; 224/485; 224/510; 224/529
[58] Field of Search ................................. 224/32 A, 37, 224/38, 42.03 R, 42.04, 42.43, 42.44, 42.45 R, 42.03 B, 42.07, 42.32, 281, 917, 42.05; 414/462; 248/575, 581; 172/326, 677, 678; 280/489, 494

[56] References Cited

U.S. PATENT DOCUMENTS

| | | |
|---|---|---|
| 1,412,192 | 4/1922 | Moore . |
| 1,505,854 | 8/1924 | Bramscum . |
| 1,648,211 | 11/1927 | Baker . |
| 2,973,817 | 3/1961 | Monthei et al. ..................... 172/678 |
| 3,039,634 | 6/1962 | Hobson et al. ................ 224/42.03 R |
| 3,251,520 | 5/1966 | Van Dyke et al. . |
| 3,260,929 | 7/1966 | Hedgepeth . |
| 3,300,111 | 1/1967 | Hedgepeth . |
| 3,414,294 | 12/1968 | Moulton ............................. 280/489 |
| 3,682,360 | 8/1972 | Fletcher et al. ..................... 224/42.05 |
| 3,724,694 | 4/1973 | Wilson . |
| 3,753,579 | 8/1973 | Kurilich, Jr. ...................... 224/42.03 B |
| 4,084,736 | 4/1978 | Jacobs, Jr. ........................ 224/42.03 B |
| 4,202,562 | 5/1980 | Sorenson .......................... 280/415 R |
| 4,239,253 | 12/1980 | Golze ................................. 224/42.04 |
| 4,394,947 | 7/1983 | Tartaglia . |
| 4,406,384 | 9/1983 | Schantz . |
| 4,596,347 | 6/1986 | Hite ................................. 224/42.08 |
| 4,646,952 | 3/1987 | Timmers . |
| 4,676,413 | 6/1987 | Began et al. . |
| 4,676,414 | 6/1987 | Deguevara ....................... 224/42.03 B |
| 4,813,584 | 3/1989 | Wiley . |
| 4,823,997 | 4/1989 | Krieger . |
| 4,844,528 | 7/1989 | Johnson . |
| 4,856,686 | 8/1989 | Workentine ..................... 224/42.03 B |
| 4,906,015 | 3/1990 | LaCroix et al. . |
| 4,915,276 | 4/1990 | Devito . |
| 4,938,399 | 7/1990 | Hull et al. ........................... 224/42.43 |
| 4,971,509 | 11/1990 | Sechovec et al. ................... 224/42.44 |
| 4,989,765 | 2/1991 | Huebner . |
| 5,029,740 | 7/1991 | Cox . |
| 5,033,662 | 7/1991 | Godin . |
| 5,038,983 | 8/1991 | Tomososki . |
| 5,108,018 | 4/1992 | Spinka ............................. 224/42.03 B |
| 5,121,862 | 6/1992 | Schmidt ........................... 224/42.03 B |
| 5,219,105 | 6/1993 | Kravitz ............................. 224/42.03 B |
| 5,224,636 | 7/1993 | Bounds ............................... 224/42.07 |
| 5,244,133 | 9/1993 | Abbot et al. ..................... 224/42.03 B |

FOREIGN PATENT DOCUMENTS

2642024 7/1990 France ........................... 224/42.03 B

*Primary Examiner*—William A. Cuchlinski, Jr.
*Assistant Examiner*—Gregory M. Vidovich

[57] ABSTRACT

A carrier system is provided for attachment to a vehicle having a pair of tubular trailer hitches mounted thereon. The carrier system comprises a pair of spaced, deflectable articulated tubular support assemblies, each having a first open end and a second open end each of the first ends being adapted for telescopic engagement with one of the trailer hitches. A cargo carrier is removably attached and solely supported from the vehicle by the support assemblies, the cargo carrier having a base provided with a pair of guide channels formed thereon. The support assemblies are receivable in the guide channels and the cargo carrier is slidably disposed along and extends over a portion of the support assemblies between the first and second ends.

8 Claims, 7 Drawing Sheets

MODULAR VEHICULAR CARRIER SYSTEM

FIELD OF THE INVENTION

This invention relates to vehicular-mounted carrier components, and more specifically, relates to a modular or interchangeable system of carrier components to be mounted on the rear of a vehicle or on a storage rack remote from the vehicle.

BACKGROUND OF THE INVENTION

In the past, a variety of cargo carriers have been designed with the objective of allowing vehicles to transport bulky or burdensome items which could not be accommodated within a vehicle's interior storage space or trunk. The drawback of conveying such cargo is particularly evident with today's modem smaller vehicles which are being produced by manufacturers for their fuel efficiency but which typically have minimal storage space. Such designs make it difficult to transport hunting, camping, and other recreational items, major appliances, powered lawn and garden equipment, building equipment and other large or heavy items which individuals would find impossible to place within their vehicles. Even if ample storage space is provided on a vehicle, it may be inconveniently located for receiving a heavier bulky load. For instance, the lifting mechanics associated with positioning a heavier awkward cargo in the trunk or interior storage space of the vehicle can inflict strain on an individual and may even cause injury.

In order to alleviate these problems, cargo carriers which are are attachable to motor vehicles have long been known and used. One known type of cargo carrier is the conventional trailer which is normally attached to a vehicle through a trailer hitch affixed to the lower rear portion of the vehicle generally at or below the vehicle bumper. Alternative cargo carriers comprise a rack, platform or other attachment secured to one or more portions of the vehicle, such as a trailer hitch, the vehicle body, or the vehicle bumper. One example of such carrier is a "car-top" type carrier for positioning a load above the roof or trunk of a vehicle.

Although prior art cargo carriers generally accomplish their intended purposes, such carriers are often subject to several drawbacks. For instance, in the case of the conventional trailer, a complex support or spring system is often necessary to avoid transferring road shocks to the wheels to the cargo carried by the trailer. Because wheels are employed, the trailer is subject to other problems associated with wheeled vehicles such as flat tires and the like. With respect to cargo carriers which are attached to one or more portions of the vehicle, such carriers are of relatively complex structure and are normally rendered relatively expensive to produce. In addition, the support structures included with these carriers require a substantial amount of time for assembly and attachment to the vehicle. Further, a cargo carrier of this type having a member which is affixed to the vehicle bumper or body may well damage the vehicle body or bumper when attached thereto. "Car-top" type carriers suffer from several disadvantages, including the height to which the load much must be lifted, increased wind resistance to forward motion of the vehicle, and incompatibility with many vehicles. Also, some of these cargo carriers tend to partially obscure a driver's visibility and make access to the rear of the vehicle difficult or impossible.

Accordingly, a need remains for a vehicle mounted carrier system which permits ready assembly and disassembly of a carrier liar convenient use in storage and facile connection thereof to an associated vehicle. Therefore, it is desirable to provide a cargo carrier which in use promotes effective gas mileage, is potable and stores easily in the vehicle or remote location for ready use, does not damage the vehicle body, can be installed on any vehicle having a trailer hitch, and provides easy access to load and unload cargo. In addition, it is desirable that the cargo carrier provide a collection of modular components which may be selectively interconnected together to increase the load carrying capacity of the vehicle. A cargo carrier should also be responsive to reactionary forces generated during the normal course of travel of the vehicle.

SUMMARY OF THE INVENTION

The present invention advantageously provides an improved cargo career system. The unique arrangement of modular or interchangeable components will markedly enhance a load carrying capacity of the vehicle. The improved cargo carrier system is easily installed secured and removed by the owner with the capability of being permanently secured in place by means of a lock mechanism, and is conveniently stored by piece in the vehicle or as a system on a rack in a remote location.

These and other advantages are realized in one aspect of the invention by a carrier system or attachment to a vehicle having a pair of tubular trailer hitches mounted thereon. The system comprises a pair of spaced deflectable, articulated tubular support assemblies, each having a first open end and a second open end. Each of the first ends is adapted for telescopic and connected engagement with one of the trailer hitches. A cargo carrier is removably attached and solely supported from the vehicle by the support members. The cargo carrier has a base provided with a pair of guide channels formed thereon, the support members being receivable in the guide channels and the cargo carrier being slidably disposed along and extending over a portion of the entire length of the support members between the first and second ends.

In a highly preferred embodiment, the invention contemplates a carrier system for attachment to a receiver hitch of a vehicle having a support assembly for supporting at least one cargo carrier thereon. The improvement resides in the support assembly being deflectable upon an upward force subjected to a first cargo carrier and the support assembly being telescopically engageable with a second cargo carrier operatively connected to the vehicle.

The invention also envisions a carrier system tier attachment to a receiver hitch of a vehicle comprising a collection of modular components adapted to be selectively interconnected together including a pair of articulated, deflectable support assemblies, a horizontal platform, a closed container, a bike rack and a ski rack. Each of the modular components is storable in a linear array on a wall-mounted rack remote from the vehicle. The rack, has parallel members with respective, displaceable protruding brackets telescopically and separately engageable with the ski rack, the bike rack, and support assemblies. The support assemblies when affixed to the wall-mounted rack support the closed container above the horizontal platform.

The invention further envisions a method of carrying cargo on a vehicle having a trailer hitch comprising the steps of providing a series of different type cargo carriers, selecting at least one cargo carrier for supporting a cargo load, attaching an articulated support assembly to said trailer hitch of said vehicle positioning said cargo carrier on the articulated support assembly capable of deflecting upon being subjected to an upward force on the cargo load, providing means for absorbing the upward shock on the cargo load, enabling a second cargo carrier to be attached to the articulated support assembly, and loading cargo with respect to at least one of the cargo carriers.

BRIEF DESCRIPTION OF THE DRAWINGS

The invention will become better understood by reference to the following detailed description of the preferred exemplary embodiment when read in conjunction with the appended drawings wherein like numerals denote like elements and.

DETAILED DESCRIPTION OF THE PREFERRED EMBODIMENT

Figure 1:
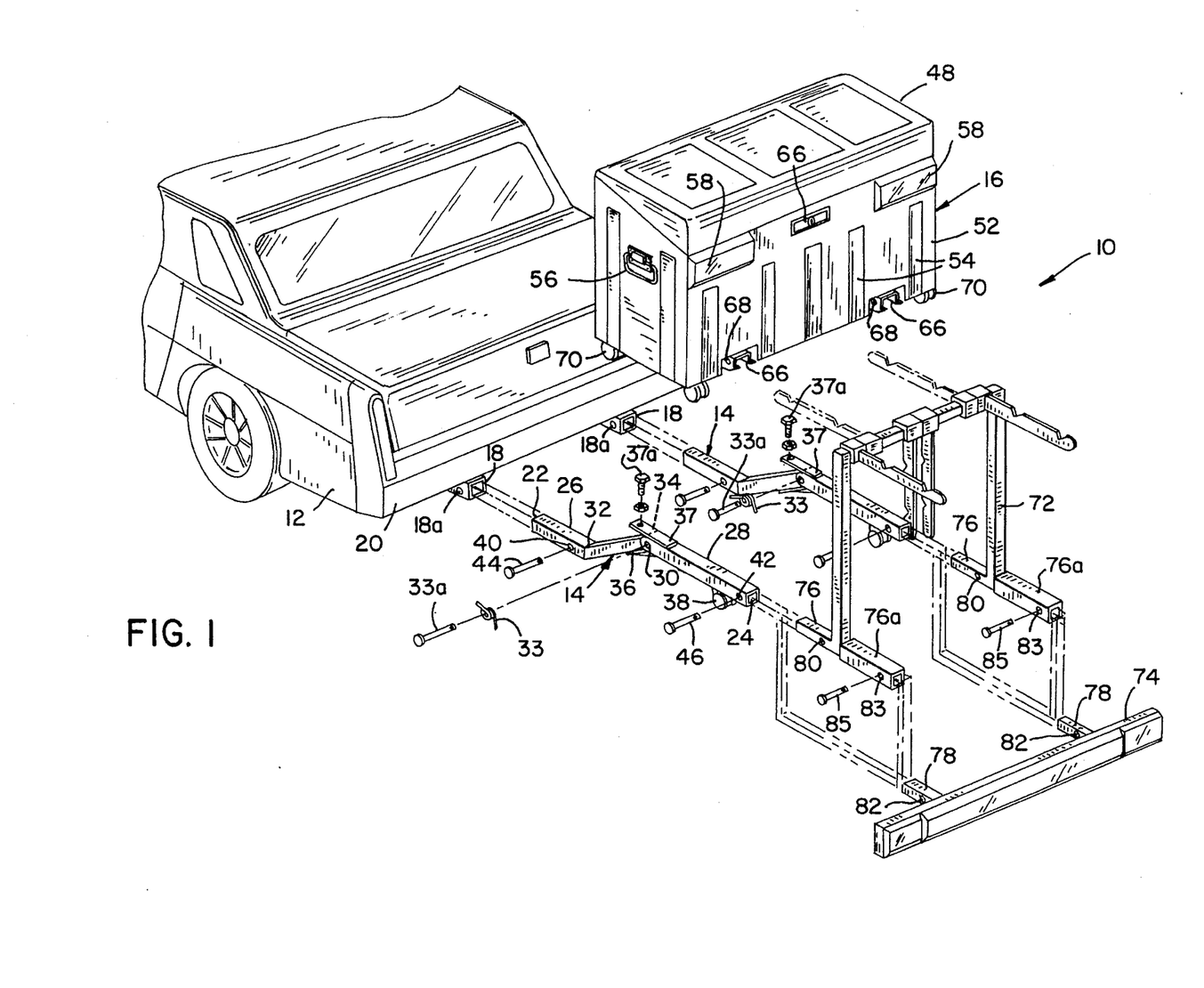
FIG. 1 is a perspective view of a first version of the cargo carrier system embodying the invention.

Referring now to FIG. 1, a cargo carrier system 10 is illustrated in position behind a vehicle 12. In the preferred embodiment, vehicle 12 is depicted as an automobile but it should be understood that any type of passenger vehicle, station wagon, panel truck or hybrid thereof may be utilized in the context of the present invention. Cargo carrier system 10 suitably comprises a pair of spaced, articulated tubular support assemblies 14 and a cargo carrier 16 removably attached and solely supported from vehicle 12 by support assemblies 14. Each of support assemblies 14 has an identical tubular structure and is adapted to be telescopically engaged with a complementary, tubular trailer hitch 18 mounted subjacent a vehicle bumper 20.

Each of support assemblies 14 has a first lower open end 22, second upper open end 24, and an articulated combination of a first rigid member 26 and a second rigid member 28 which are articulated together at pivot 30. Each support assembly 14 is formed with two bends 32, 34 so that the end portions of first rigid member 26 and second rigid member 28 are parallel to each other with the end portion of first rigid member 26 being spaced lower than second rigid member 28. An angular plate 36 is provided on the underside of each support assembly 14 to prevent downward deflection of second rigid member 28 with respect to first rigid member 26. In order to control the upward deflection of member 28 with respect to member 26, a downwardly biased, shock absorbing spring 33 retained by pin 33a is provided adjacent pivot 30 and a plate 37 is provided on member 28 so that a fastener 37a screwthreaded therethrough can be adjusted vertically with respect to member 26. Also provided on the underside of each support assembly adjacent the second open end 24 is a set of casters 38 for responding to certain reactionary forces generated during travel of the vehicle 12 as will be hereafter appreciated. Apertures 40, 42 are formed on respective ends 22 and 24 of each support assembly and cooperate with respective pins 44, 46 which facilitate connection of cargo carrier system 10.

Figure 10:
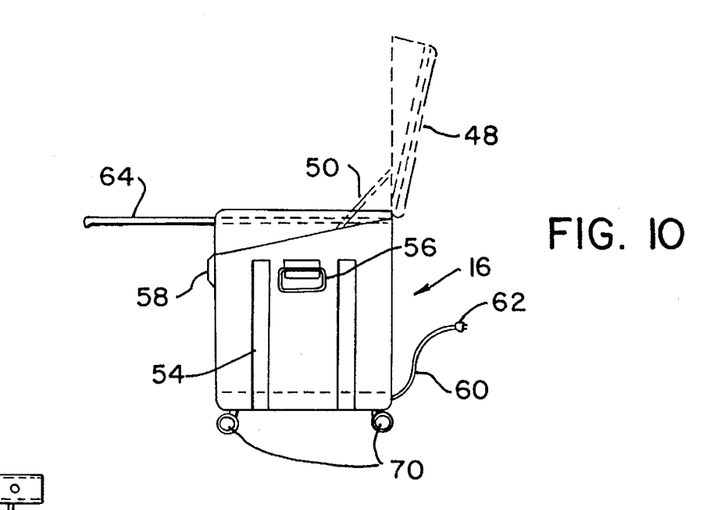
FIG. 10 is a side view of a cargo box used in one version of the cargo carrier system.

As best seen in FIGS. 1 and 10, cargo carder 16 takes the form of a trunk-like box molded of durable polymeric or fiberglass material and having a hinged lid 48 capable of being held open by an adjustable strut 50 or the like for loading and unloading cargo into carder 16. Lid 48 is cut on a decline so as to allow easier loading and unloading from the front of cargo carrier 16. Cargo carrier 16 also has a base 52 which is formed with a series of strengthening ribs or cutouts 54 and is provided with a set of handles 56 to facilitate hand carrying cargo carrier 16 when it is not connected to vehicle 12. Base 52 includes a pair of laterally spaced electrical lights 58 for use at night or as weather conditions dictate. Lights 58 which may include turn indicator lights, running lights, and brake lights are connected to the vehicle electrical system via cable 60 and detachable connector 62. The front of cargo carrier 16 may also include a pullout utility table 64 which is normally stored inside cargo carrier 16. Lid 48 is secured to base 52 in the closed position by at least one locking mechanism 66 which adds an element of security to cargo carrier 16. Base 52 is provided with a pair of guide channels 66 cooperable with members 28 such that support assemblies 14 are receivable in guide channels 66 and cargo carrier 16 is slidably disposed along and extends over a portion of support assemblies 14 between the first and second ends 22, 24 respectively. Each of guide channels 66 is formed with a transverse opening 68 which is alignable with aperture 42 and pin 46 as will be hereafter appreciated. Casters 70 are provided in each corner of base 52 in order to allow easy transport of cargo carrier 16 when it is disconnected from vehicle 12.

Figure 2:
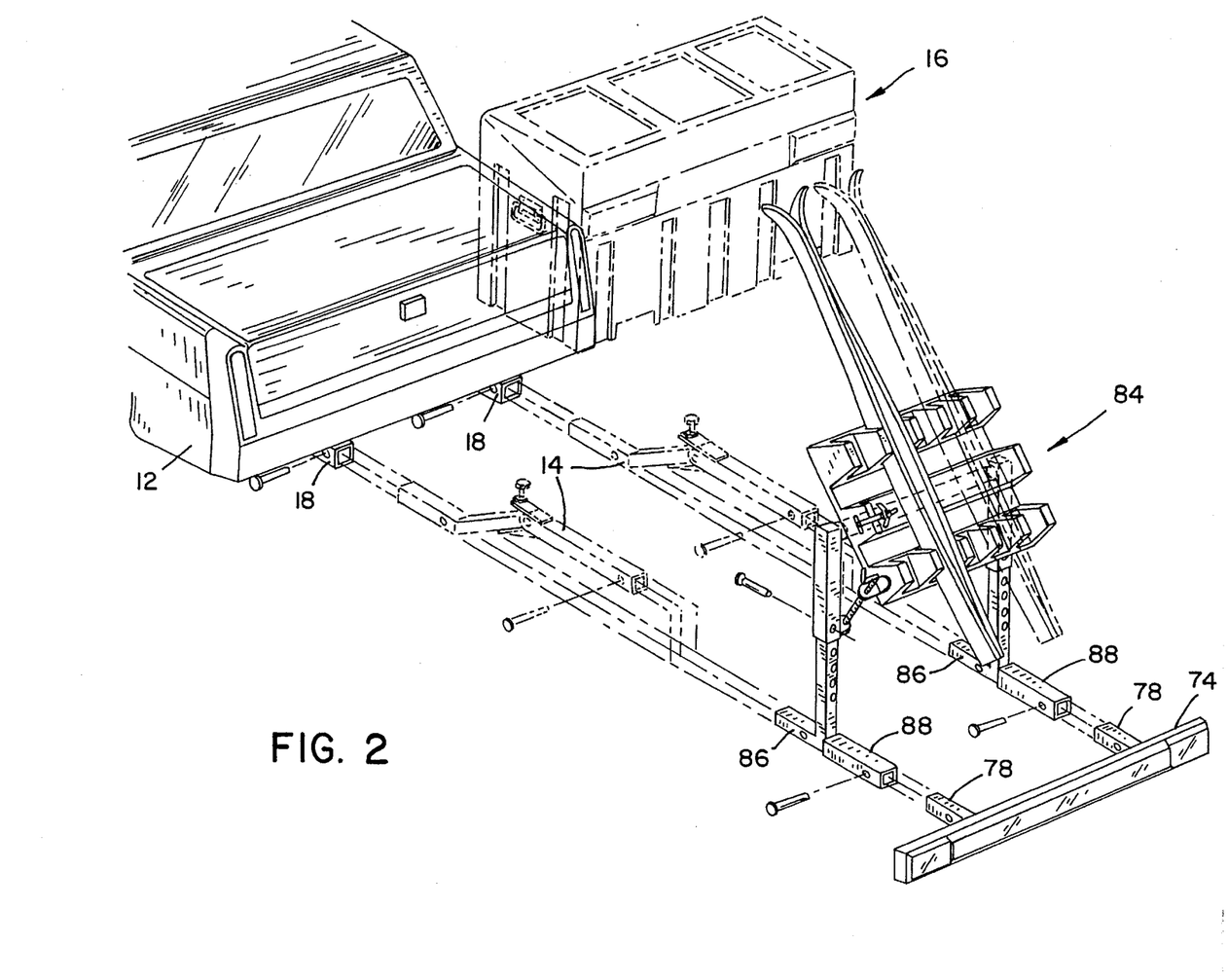
FIG. 2 is a perspective view of a second version of the cargo carrier system.
Figure 3:
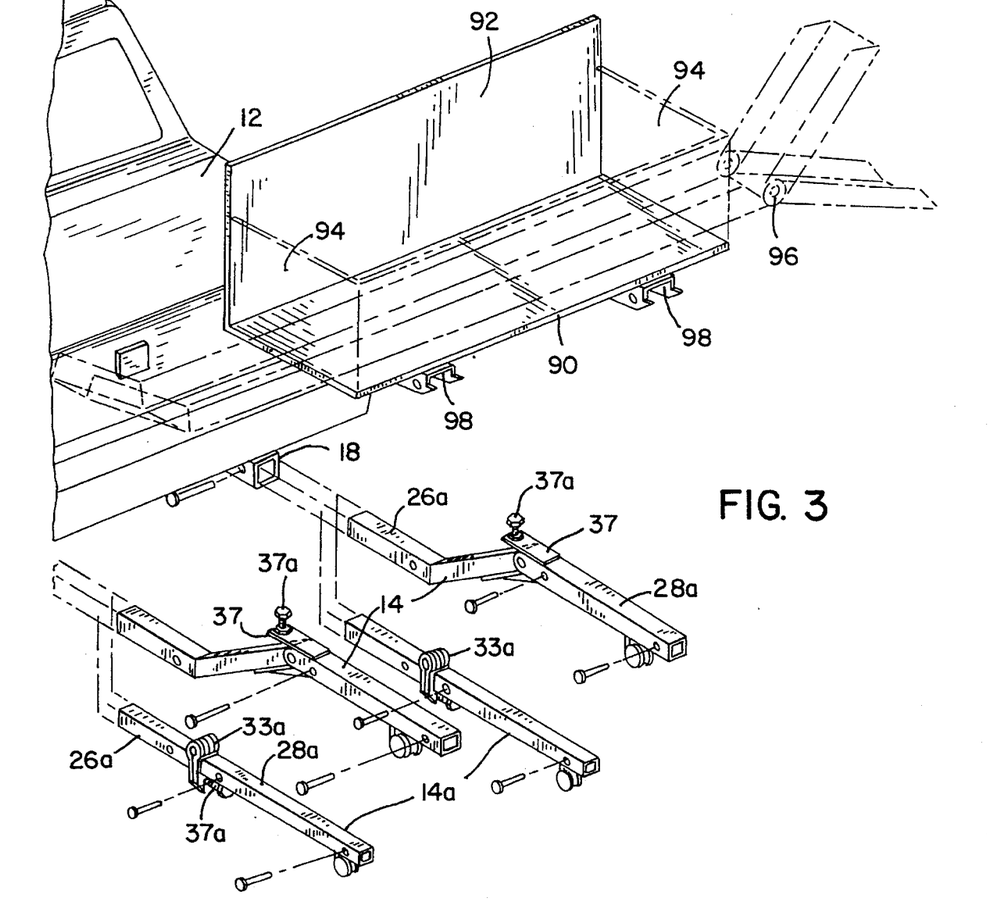
FIG. 3 is a perspective view of a third version of the cargo carrier system.
Figure 4:
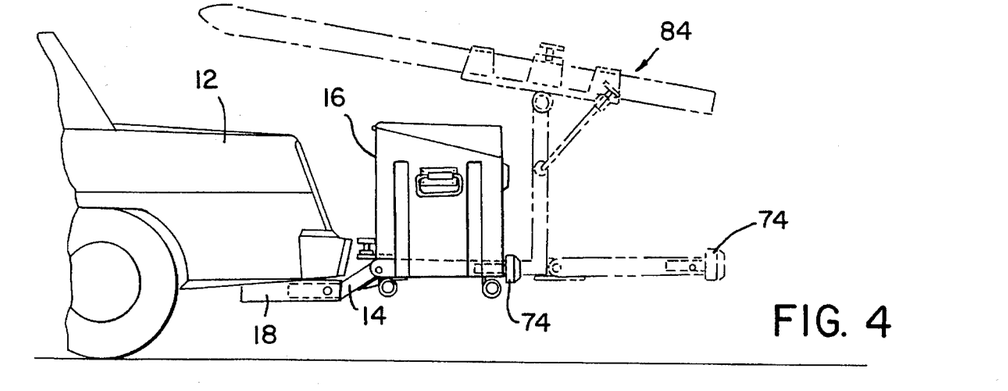
FIGS. 4 through 8 are respective side views of further versions of the cargo carrier system of the invention.
Figure 5:
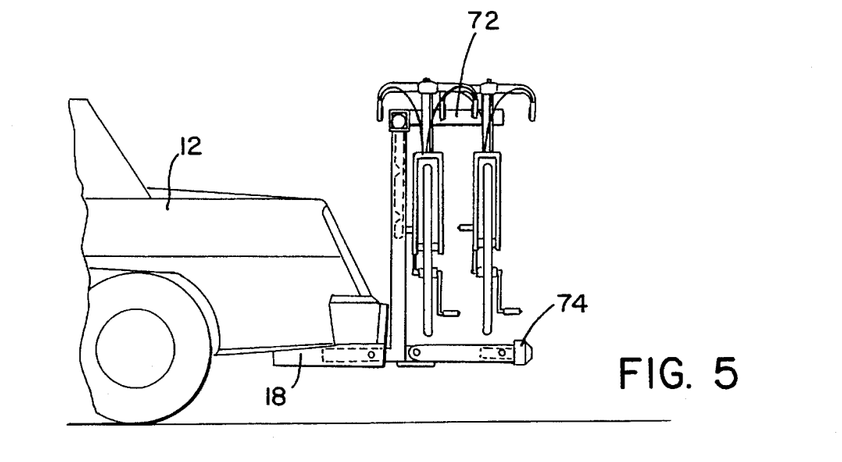
Figure 6:
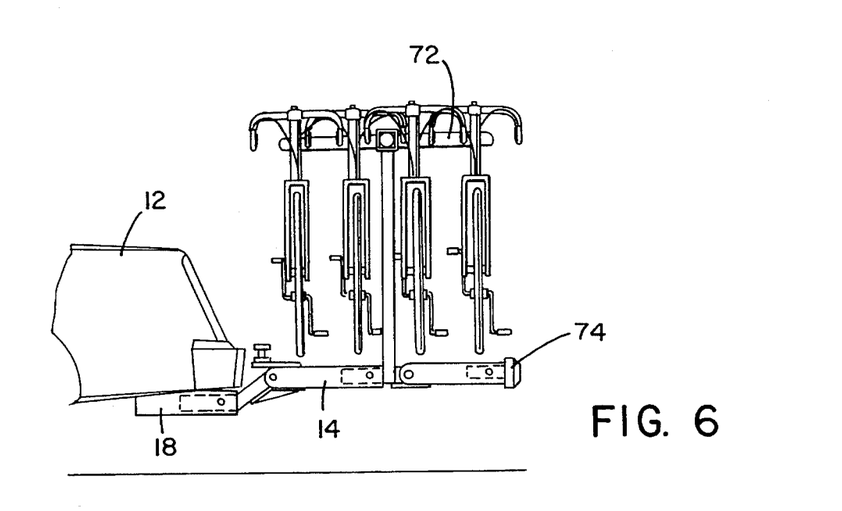
Figure 7:
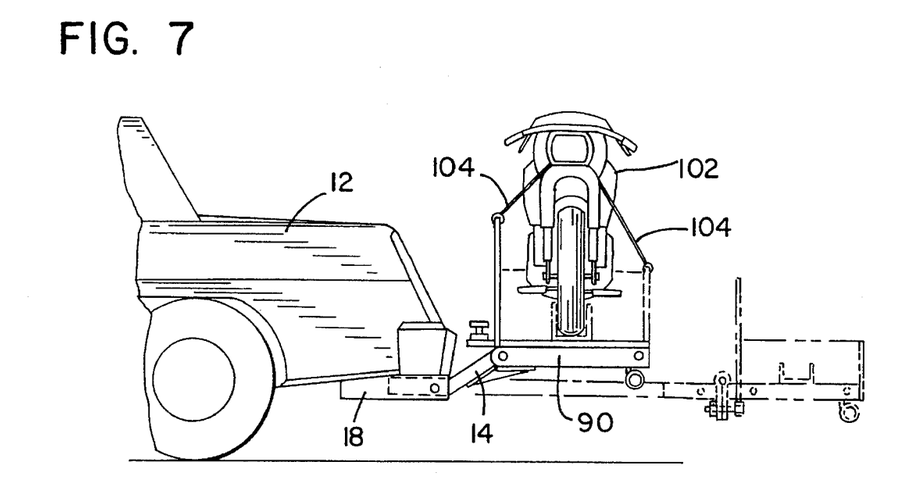
Figure 8:
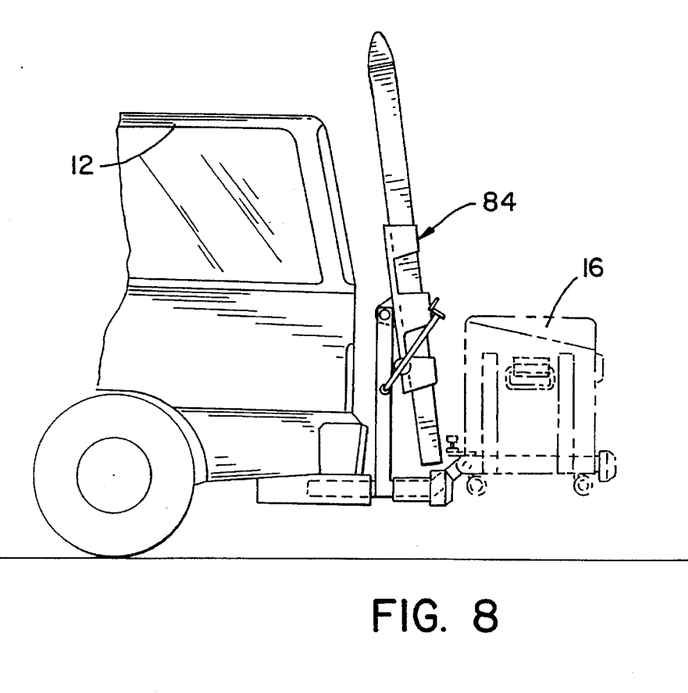
Figure 12:
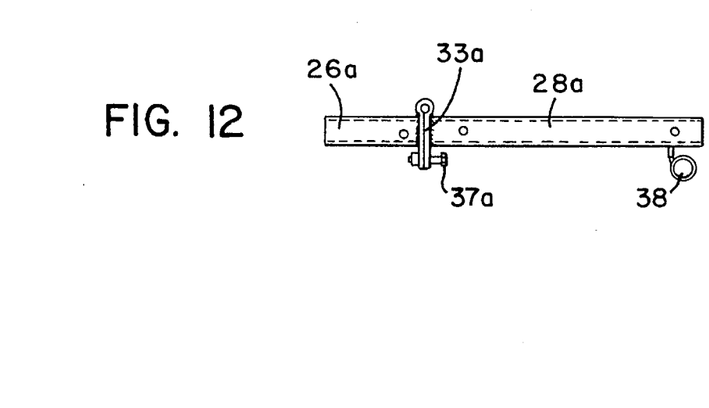
FIG. 12 is a side elevation view of an alternative support assembly used in the cargo carrier.

As a salient feature of the invention, another cargo carrier in the form of a bike rack 72 having tubular ends 76, 76a, or alternatively a bumper bar 74 having tubular ends 78 respectively, may be telescopically engaged with the second open end 24 of each support assembly 14. Alternatively, tubular ends 76a may be telescopically engaged with ends 78. Again, suitable apertures 80, 82 respectively, are formed on carrier 72 and bumper bar 74, respectively, so as to cooperate with apertures 42 and pins 46 on support assemblies 14. Likewise, apertures 83 are alignable with apertures 82 and held together by pins 85. FIGS. 2–8 represent different versions or combinations of the cargo carder system 10 which provide a modular or interchangeable system of carder components to be mounted on the rear vehicle to enhance the load carrying capacity thereof. FIG. 2 combines trunk-like box carrier 16 with an angularly adjustable ski rack 84. The bottom of ski rack 84 has tubular legs 86, 88 which cooperate with support assemblies 14 and bumper bar 74 respectively in a manner as previously described. FIG. 3 shows cargo carrier system 10 having a removable platform 90 with a back panel 92 and side panels 94 which may either be rigid or may be hinged such as shown at 96 to provide a ramp for facilitating loading of objects such as motorcycles or the like. The bottom of platform 90 is formed with guide channels 98 which are similar to guide channels 66 as previously described and which cooperate with respective support assemblies 14. FIG. 3 also shows a pair of alternative support assemblies 14a having straight, aligned pivoted members 26a, 28a including a spring 33a and stop 37a. This version is preferred for use with heavier loads such as shown in dotted lines of FIG. 7. FIG. 12 shows support assembly 14a in a side view. FIG. 4 is a side view showing the cargo carrier system of FIG. 2 in assembled form with the bumper bar 74 in various positions relative to ski rack 84. FIG. 5 shows a cargo carrier system employing bike rack 72 which is telescopically engaged directly with trailer hitch 18. FIG. 6 shows a cargo carrier system 10 employing an expanded bike rack 72 in combination with support assembly 14 and bumper bar 74. FIG. 7 illustrates a cargo carrier system 10 employing a horizontal rack or platform 90 having a motorcycle 102 retained thereon with the assistance of retention lines 104. FIG. 8 shows an alternative combination of FIG. 4 wherein the cargo carrier 16 is placed behind ski rack 84 on a hybrid vehicle 12 such as a Bronco or a Blazer.

Figure 9:
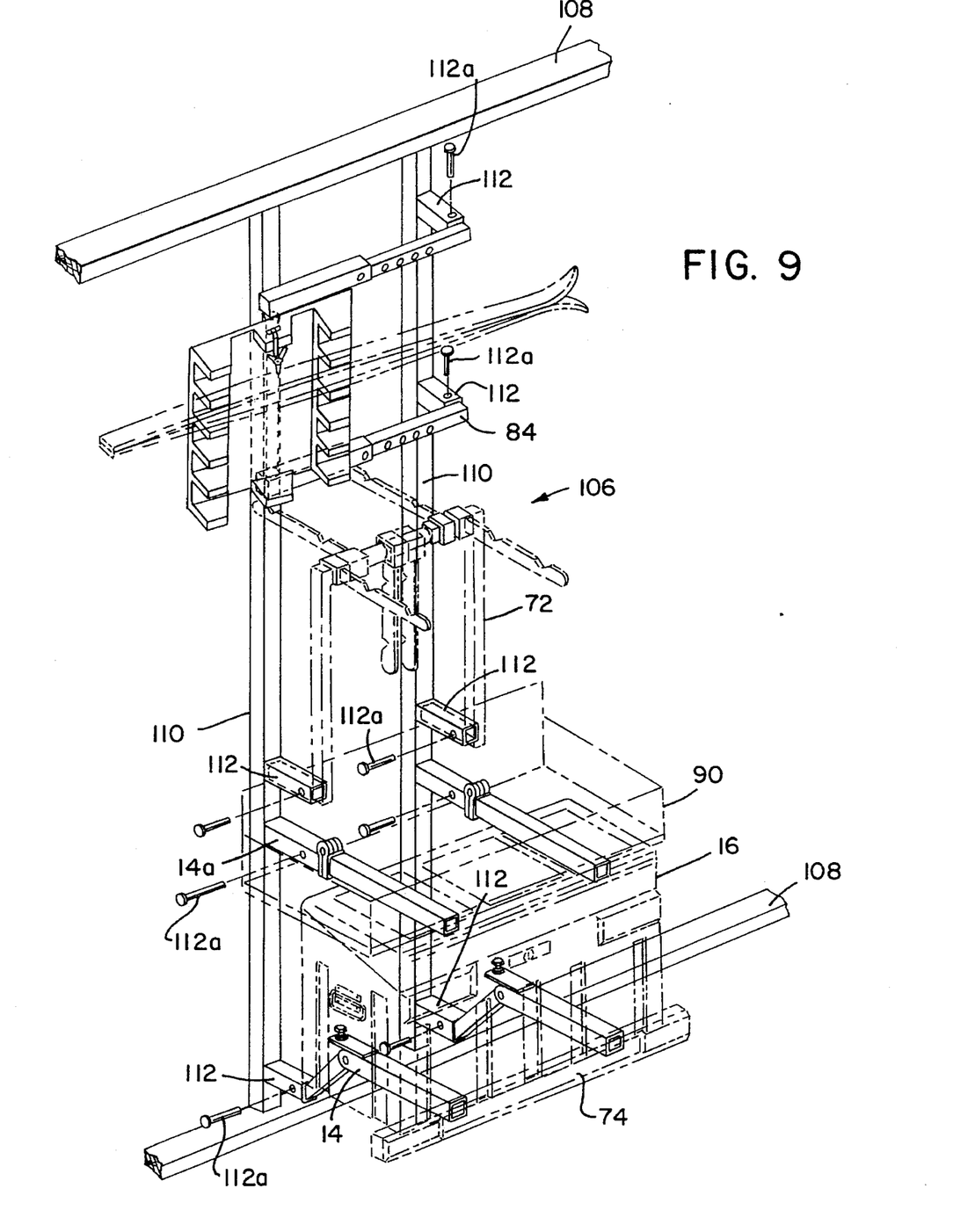
FIG. 9 is a perspective view of the storage rack in connection with the cargo carrier system.

Another feature of the invention resides in a wall-mounted rack 106 (FIG. 9) located remote from vehicle 12 such as in a garage or the like having upper and lower studs 108. Positioned generally perpendicular to studs 108 is a pair of generally parallel rack members 110 having a plurality of displaceable protruding brackets 112 adjustably provided thereon with respective retaining pins 112a. Each of the protruding brackets 112 is telescopically and separately engageable with ski rack 84, bike rack 72 and support assemblies 14. 14a support assemblies 14 when affixed to rack 106 supporting cargo carrier 16 between horizontal platform 90 and bumper bar 74. With this arrangement, cargo carrier system 10 is conveniently storable in a linear array in a location remote from vehicle 12.

To install cargo carrier system 10 as illustrated in FIG. 1, the user simply pulls each support assembly 14 into place so that first open end 22 is telescopically engageable with hitch 18 and locked into place by inserting pin 44 through apertures 40 and 18A of trailer hitch. Next, the cargo carrier 16 is rolled via wheels 70 such that channels 66, which are slightly wider than member 28, are slidably disposed thereon substantially along the entire length thereof. When apertures 68 and 42 have been aligned with each other locking pin 46 is inserted therethrough to hold carrier 16 with respect support assemblies 14. Thereafter, as desired, either leg 76 of bike rack 72 or leg 78 of bumper bar 74 are telescopically engaged with open end 24 of support assembly such that apertures 80 or 82 are alignable with aperture 42 and locking pin 46.

It should be recognized that the length and geometry of the support assemblies 14 elevate cargo carriers 16, 72, 84 and 90 to maximize ground clearance of the cargo carrier system and at the same time provide visibility to assist the driver in backing up the vehicle safely. Due to the articulated structure of each support assembly 14 and the provision of reinforcement plate 36 on the underside thereof, it should be appreciated that member 28 is deflectable upwardly upon an upward force subjected to cargo carrier 16 during normal road travel. However, shock absorbing spring 33 and the adjustment of fastener 37a in plate 37 limit the degree of upward deflection and cooperate with casters 38 which temporarily absorb road contact should the vehicle encounter depressions, steep inclines, or the like. With this arrangement, the stability of the cargo load is maximized at all times. The present invention provides a remarkable versatility enhancing the load carrying capacity of a vehicle while at the same time offering a unique attendant storage system therefore.

Figure 11:
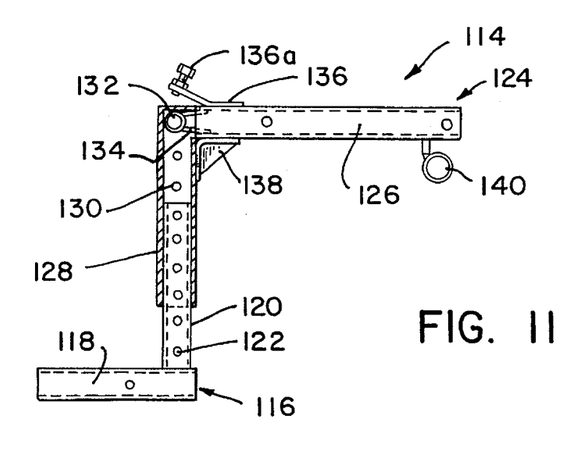
FIG. 11 is a side view of an alternative arrangement of a support assembly used in the cargo carrier system.

While the invention has been described with reference to a preferred embodiment, those skilled in the art will appreciate that certain substitutions, alterations and omissions may be made without departing from the spirit thereof. For example, although the preferred form of the invention sets forth a specific construction of support assembly 14, it should be apparent that a stepwise, vertically adjusted support member for supporting cargo carrier at various heights could also be provided for providing the same function. For example, as shown in FIG. 11, an alternative support assembly 114 has a first rigid member 116 comprising a horizontal leg 118 joined orthogonally to a vertical leg 120 provided with a series of vertically spaced apertures 122. A second rigid member 124 comprises a horizontal leg 126 and a vertical leg 128 with apertures 130. Vertical leg 120 is telescopically received in vertical leg 128 such that desired apertures 122, 130 are aligned and pivot pin 132 is inserted therethrough. As described above, a spring 134 is provided along with a plate 136 and cooperating fastener 136a to limit upward deflection of member 124. Also, a reinforcement plate 138 prevents downward deflection of member 124 and a set of casters 140 is mounted on the bottom and free end of horizontal leg 126 for absorbing road shock as previously described. Accordingly, the foregoing description is meant to be exemplary only and should not be deemed limitative on the scope of the invention set forth with the respect to the following claims.

We claim:

1. A method of carrying cargo on a vehicle having a trailer hitch comprising the steps of:

providing a series of different types of cargo carriers;

selecting one of said cargo carders from said series;

attaching an articulated support assembly to said trailer hitch of said vehicle, said support assembly having a first end and an opposite second end, said first end adapted to be received in said trailer hitch such that said opposite second end is cantilevered from said trailer hitch and disposed in a substantially horizontal plane;

slidably disposing said one of said cargo carriers on a portion of said articulated support assembly, said second end of said articulated support assembly being adapted to pivot upwardly from said horizontal plane at a junction intermediate said first end and said portion when subjected to an upward force while said one of said cargo carriers is disposed thereon; and providing means directly on said articulated support assembly at said junction for absorbing shock caused by the upward force.

2. The method of carrying cargo of claim 1 further comprising:

selecting a second cargo carrier from said series, said second carrier adapted to be telescopically engaged within the second end of the support assembly; and loading a cargo load onto at least one of said cargo carriers.

3. A carrier system for attachment to a vehicle having a pair of tubular trailer hitches mounted thereon, said system comprising:

a pair of deflectable, articulated tubular support assemblies, each of said assemblies having a first open end and an opposite second open end, each of said first ends adapted to be telescopically engaged with said trailer hitches, respectively, such that each of said second ends are cantilevered therefrom to be disposed in a substantially horizontal plane, said support assemblies each being deflectable at a junction intermediate said first and second ends;

a first cargo carrier removably attached and solely supported from said vehicle by said support assemblies, said first cargo carrier having a base provided with a pair of guide channels formed thereon, each of said support assemblies being receivable in said guide channels, respectively, and said first cargo carrier being slidably disposed between each said junction and each said second end;

means for securing each of said second ends to said first cargo carrier for preventing sliding movement of said cargo carrier on said support assemblies; and a second cargo carrier adapted to be telescopically engaged with said second ends.

4. The carrier system of claim 3, wherein said either of said first or second cargo carriers comprises a closed container.

5. The carrier system of claim 3, wherein said either of said first or second cargo carriers comprises a horizontal platform.

6. The carrier system of claim 3, wherein either of said first or second cargo carriers comprises a ski rack.

7. The carrier system of claim 3, wherein either of said first or second cargo carriers comprises a bike rack.

8. A carrier system for attachment to a vehicle having a pair of tubular trailer hitches mounted thereon, said system comprising:

a pair of deflectable, articulated tubular support assemblies, each of said assemblies having a first open end and an opposite second open end, each of said first ends adapted to be telescopically engaged with said trailer hitches, respectively, such that each of said second ends are cantilevered therefrom to be disposed in a substantially horizontal plane, said support assemblies each being deflectable at a junction intermediate said first and second ends;

a cargo carrier removably attached and solely supported from said vehicle by said support assemblies, said cargo carrier having a base provided with a pair of guide channels formed thereon, each of said support assemblies being receivable in said guide channels, respectively, and said cargo carrier being slidably disposed between each said junction and each said second end;

means for securing each of said second ends to said cargo carder for preventing sliding movement of said cargo carrier on said support assemblies; and a second cargo carrier adapted to be telescopically engaged with said second ends, said second cargo carrier including a vertically adjustable support member for supporting a cargo load at various heights relative to said trailer hitches.

\* \* \* \* \*